US012487333B2

(12) United States Patent  
Karayacoubian et al.

(10) Patent No.: US 12,487,333 B2  
(45) Date of Patent: Dec. 2, 2025

(54) SELF-CONTAINED ENVIRONMENTAL CONTROL SYSTEM FOR INDUSTRIAL AND AUTOMOTIVE SENSING

(71) Applicant: FORD GLOBAL TECHNOLOGIES, LLC, Dearborn, MI (US)

(72) Inventors: Paul Karayacoubian, Mountain View, CA (US); Ryan Thomas Davis, Woodside, CA (US); Morgan Wagner, Pittsburgh, PA (US); Rituja Dhananjay Marathe, San Francisco, CA (US); Bilge Kocer, Mountain View, CA (US); Aaron Rifkin, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 1169 days.

(21) Appl. No.: 17/381,476

(22) Filed: Jul. 21, 2021

(65) Prior Publication Data

US 2023/0025984 A1    Jan. 26, 2023

(51) Int. Cl.
| | | |
|---|---|---|
| *G01S 7/48* | (2006.01) | |
| *B60H 1/00* | (2006.01) | |
| *G01S 7/481* | (2006.01) | |
| *G01S 17/931* | (2020.01) | |

(52) U.S. Cl.  
CPC ........ *G01S 7/4813* (2013.01); *B60H 1/00271* (2013.01); *G01S 17/931* (2020.01); *B60H 2001/003* (2013.01)

(58) Field of Classification Search  
None  
See application file for complete search history.

(56) References Cited

U.S. PATENT DOCUMENTS

| | | |
|---|---|---|
| 9,425,654 B2 | 8/2016 | Lenius et al. |
| 9,882,433 B2 | 1/2018 | Lenius et al. |
| 10,042,042 B2 | 8/2018 | Miremadi |
| 10,109,183 B1 | 10/2018 | Franz et al. |
| 10,122,416 B2 | 11/2018 | Berger et al. |
| 2008/0151505 A1 | 6/2008 | Chen et al. |

(Continued)

FOREIGN PATENT DOCUMENTS

| | | | |
|---|---|---|---|
| DE | 102018203075 A1 * | 9/2019 | ............. B60K 11/04 |
| DE | 102019211898 A1 * | 2/2021 | |

(Continued)

OTHER PUBLICATIONS

International Search Report of PCT/US2022/037653 mailed Nov. 9, 2022, 3 pages.

(Continued)

*Primary Examiner* — Hovhannes Baghdasaryan  
(74) *Attorney, Agent, or Firm* — Frank A. MacKenzie; Brooks Kushman, P.C.

(57) ABSTRACT

A vehicle sensing system may include a housing for containing sensor electronics, the housing having at least one window being aligned with at least one of the sensor electronics within the housing, a fan arranged on the housing and configured to provide airflow through the housing, and a conditioning element having a plurality of fins forming configured to receive the airflow from the fan to cool the sensor electronics and to direct warmed air from the fins onto the window to provide the warmed air to the window.

11 Claims, 6 Drawing Sheets

(56) References Cited

U.S. PATENT DOCUMENTS

| | | | |
|---|---|---|---|
| 2018/0118041 A1 | 5/2018 | Lenius et al. | |
| 2018/0364334 A1 | 12/2018 | Xiang et al. | |
| 2019/0011285 A1 | 1/2019 | Utermoehlen et al. | |
| 2019/0011290 A1 | 1/2019 | Utermoehlen et al. | |
| 2019/0011537 A1 | 1/2019 | Utermoehlen et al. | |
| 2019/0064325 A1 | 2/2019 | Miremadi | |
| 2019/0118737 A1 | 4/2019 | Li et al. | |
| 2019/0146066 A1 | 5/2019 | Kunze | |
| 2019/0179028 A1 | 6/2019 | Pacala et al. | |
| 2019/0204845 A1 | 7/2019 | Grossman et al. | |
| 2019/0277949 A1 | 9/2019 | Krishnan et al. | |
| 2020/0191614 A1 | 6/2020 | Ellgas et al. | |
| 2021/0063540 A1 | 3/2021 | Krishnan et al. | |
| 2022/0221560 A1 * | 7/2022 | Karayacoubian | G01S 7/4813 |

FOREIGN PATENT DOCUMENTS

| | | |
|---|---|---|
| DE | 102019220388 A1 * | 6/2021 |
| KR | 20210028114 A | 3/2021 |
| WO | 2018125709 A1 | 7/2018 |
| WO | 2019113368 A1 | 6/2019 |
| WO | 2019152540 A1 | 8/2019 |

OTHER PUBLICATIONS

Written Opinion of PCT/US2022/037653 mailed Nov. 9, 2022, 5 pages.

* cited by examiner

SELF-CONTAINED ENVIRONMENTAL CONTROL SYSTEM FOR INDUSTRIAL AND AUTOMOTIVE SENSING

FIELD OF THE INVENTION

Described herein are systems relating to cooling and cleaning systems for automotive sensing units.

BACKGROUND

Vehicles may include various sensing units such as LIDAR systems and camera systems. These sensing units may dissipate heat, as well as be exposed to debris and weather elements. The electronics included in the sensing units may be required to be maintained within certain temperature limits in order for the sensing unit to function properly. Furthermore, the sensing units may be exposed to debris, as well as weather elements causing ice buildup thereon.

SUMMARY

A LIDAR sensor system may include a housing for containing LIDAR electronics, the housing having at least one window being aligned with at least one of the LIDAR electronics within the housing, a fan arranged below the housing and configured to provide airflow from the underside of the housing, a conditioning element having a plurality of contoured fins defining a first portion configured to receive the airflow from the fan to cool the LIDAR electronics by collecting at least a portion of waste heat withing the airflow, the contoured fins defining a second portion curved relative to the vertical portion and configured to direct the airflow onto the window to provide warmed air to the window.

A vehicle sensing system may include a housing for containing sensor electronics, the housing having at least one window being aligned with at least one of the sensor electronics within the housing, a fan arranged proximate to the housing and configured to provide airflow through the housing; and a conditioning element having a plurality of fins configured to receive the airflow generated by the fan to cool the sensor electronics, wherein airflow passing over the sensor electronics is directed onto the window to recycle the airflow used to cool the electronics to clean to the window.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Often when sensing technology like LIDARS, cameras, ultrasonics, radars, etc., are integrated into vehicles or other industrial platforms, there is a need to mitigate environmental conditions which impact sensing performance, such as heat, debris, or condensation. Such mitigation is often done through complex systems that are difficult to integrate into the existing platforms, such as a network of pressurized air or liquid cooling systems. These solutions are complex and require additional engineering to properly route throughout the platform without losing sensor performance.

Disclosed herein is a self-contained sensor system configured to both cool sensor components within a sensing unit, as well as use the same air to clean the sensing unit. In the example of a LIDAR system, a fan may be arranged below a LIDAR housing and provide air at the underside of the LIDAR housing to provide air to contoured or bent fins of a conditioning element that both dissipates heat and delivers the air used to cool the sensor components to a window of the LIDAR housing to clean the window. In the example of a camera assembly, the housing may maintain the conditioning element with fins extending therefrom on a back of a camera body. The fan may suction air over the pin-shaped fins, through the fan, and out through a duct that exhausts the air onto a camera lens. In some cases, the recycled air may be warmed by the fins prior to being used to clean the window or lens. Thus, the system both cools and cleans the sensor unit without the need for additional parts, liquid cooling, etc.

Figure 1:
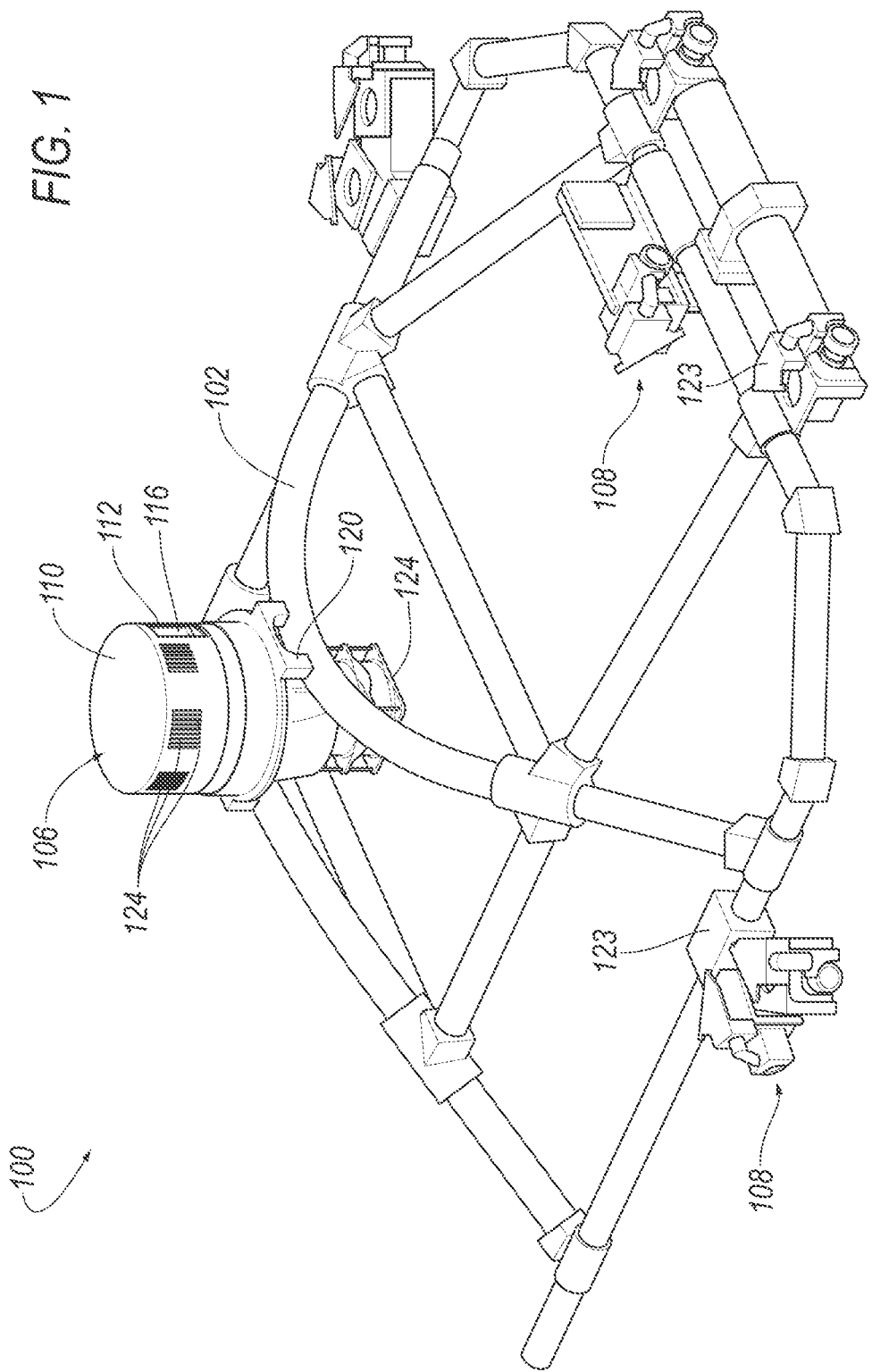
FIG. 1 illustrates a perspective view of an example vehicle sensor system having a frame and sensing units maintained thereon.

FIG. 1 illustrates a perspective view of an example vehicle sensor system 100 having a frame 102 and sensing units maintained thereon. The sensing units may include a LIDAR system 106 and at least one camera assembly 108. In the example shown in FIG. 1, multiple camera assemblies 108 are arranged along the frame 102. The LIDAR system 106 includes a sensor head 110 having a housing 112 configured to house electronic components of the LIDAR system 106. The housing 112 may surround the electronic components and maintain a conditioning element (shown in FIG. 3), therein. The sensor head 110 may include one or more emitting devices, detecting devices, and computing systems, such as processors, in addition to the LIDAR electronic components, in order to gather distance information about surrounding objects. The LIDAR system 106 may be integrated into or onto a vehicle (not shown in the figures).

In some embodiments, the emitting device may be a laser diode for emitting a light pulse. The detector device may be a photodetector, such as an Avalanche Photodiode (APD), or more specifically an APD that may operate in Geiger Mode, however, any other type of photodetector may be used as well. The terms "photodetector" and "detector device" may be used interchangeably herein. APDs are photodiodes that operate with a relatively large gain compared to normal photodiodes, and Geiger Mode APDs are operated slightly above the breakdown threshold voltage, where even a single electron—hole pair can trigger an output signal that is identifiable by data processing elements. The computing system, or processors, may be used to perform any of the operations associated with the LIDAR system 106 or otherwise. Additionally, the sensor head 110 may rotate or spin at a given frequency, which may allow the LIDAR system 106 to emit light in different directions up to a full 360 degree field of view around the LIDAR system 106.

The housing 112 may include at least one window 116 configured to expose the electronics of the LIDAR to the external environment. The window 116 may be an opening in the housing to allow for light ingress and/or egress from the housing 112. The window 116 may also allow airflow from the external environment to enter or exit the inside of the housing 112.

The LIDAR system 106 may be fixed to the frame 102 via a LIDAR mounting unit 120. The LIDAR mounting unit 120, also referred to herein as a mounting plate, may be configured to attach to two supports of the frame 102 to maintain the LIDAR system 106 in a fixed and secure position. A support structure 122 may be arranged below the sensor head 110 and extend partially between the supports of the frame 102. At least one fan 124 is arranged below the support structure 122. The fan 124 is configured to provide airflow to the underside of the sensor head 110. The fan 124 may thus be an in-line fan configured to provide ambient and/or cool air through the bottom of the sensor head 110 in order to cool the electrical components within the housing 112.

The camera assembly 108 may be fixed to the frame 102 via a camera mounting unit 123. The camera mounting unit 123 may be integrated with other Tracking & Imaging Radar (TIRA) system components such as LIDAR systems, etc. The camera assembly 108 is discussed in more detail with respect to FIGS. 5-7 below.

Figure 2:
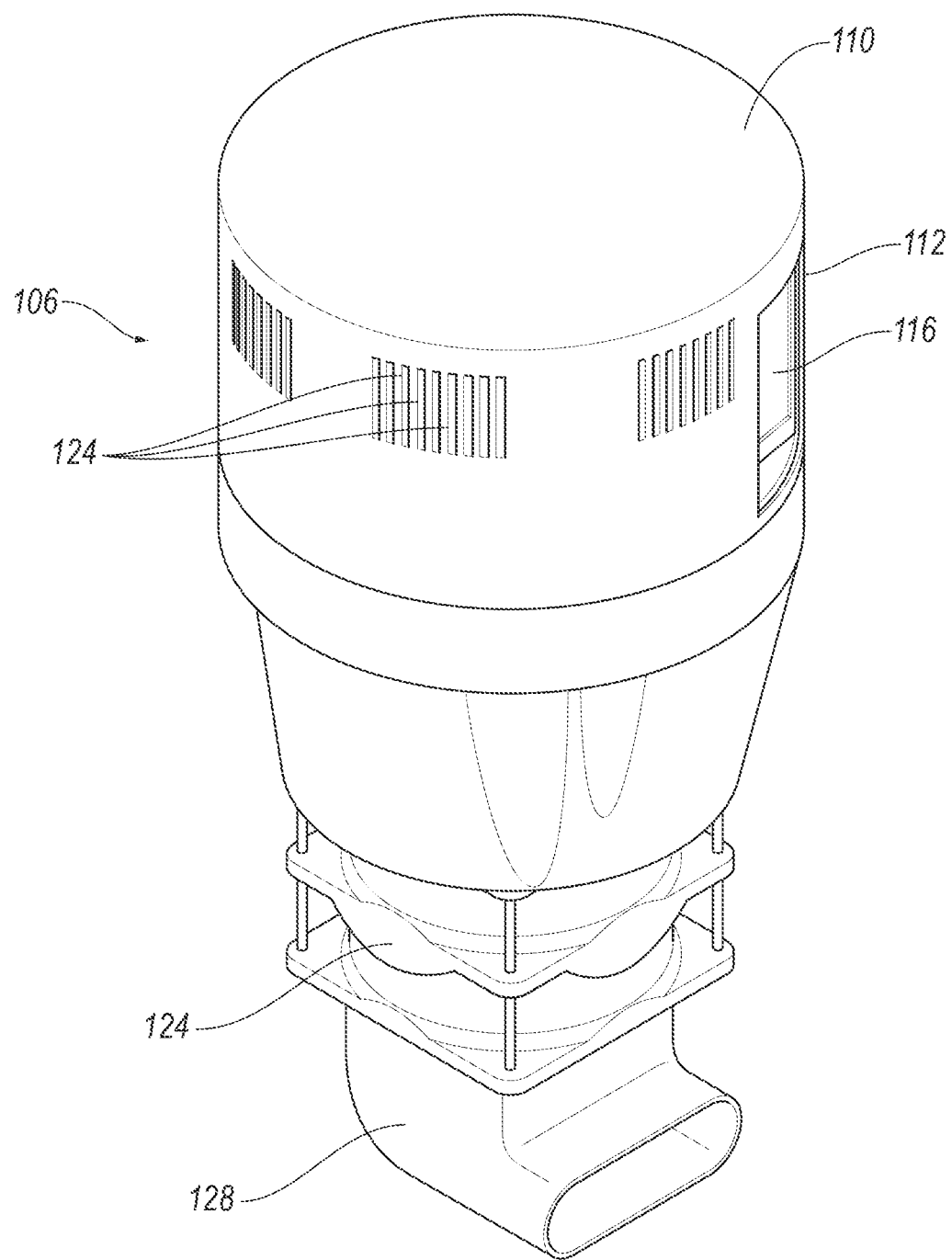
FIG. 2 illustrates a perspective view of a LIDAR system of FIG. 1.

FIG. 2 illustrates a perspective view of the LIDAR system 106 of FIG. 1 separate from the frame 102. The LIDAR system 106 may be a self-contained single unit including the fan 124, support structure 122 and sensor head 110. A duct 128 may be arranged below the fan 124 and may be included to guide air into the fan 124. In some example, the duct 128 may include a grated cover (not shown) to prevent any sizable debris from being sucked into the fan 124. The fan 124 may be bolted, or otherwise fixed to the support structure 122.

As illustrated in FIG. 2, the housing 112 of the sensor head 110 may define a plurality of slots 130 arranged spaced and vertical along the housing 112. The slots 130 may allow for airflow therebetween. In one event, the airflow may be air from the fan 124, but typically the airflow is generated by rotation of the LIDAR electronics within the housing 112.

Figure 3:
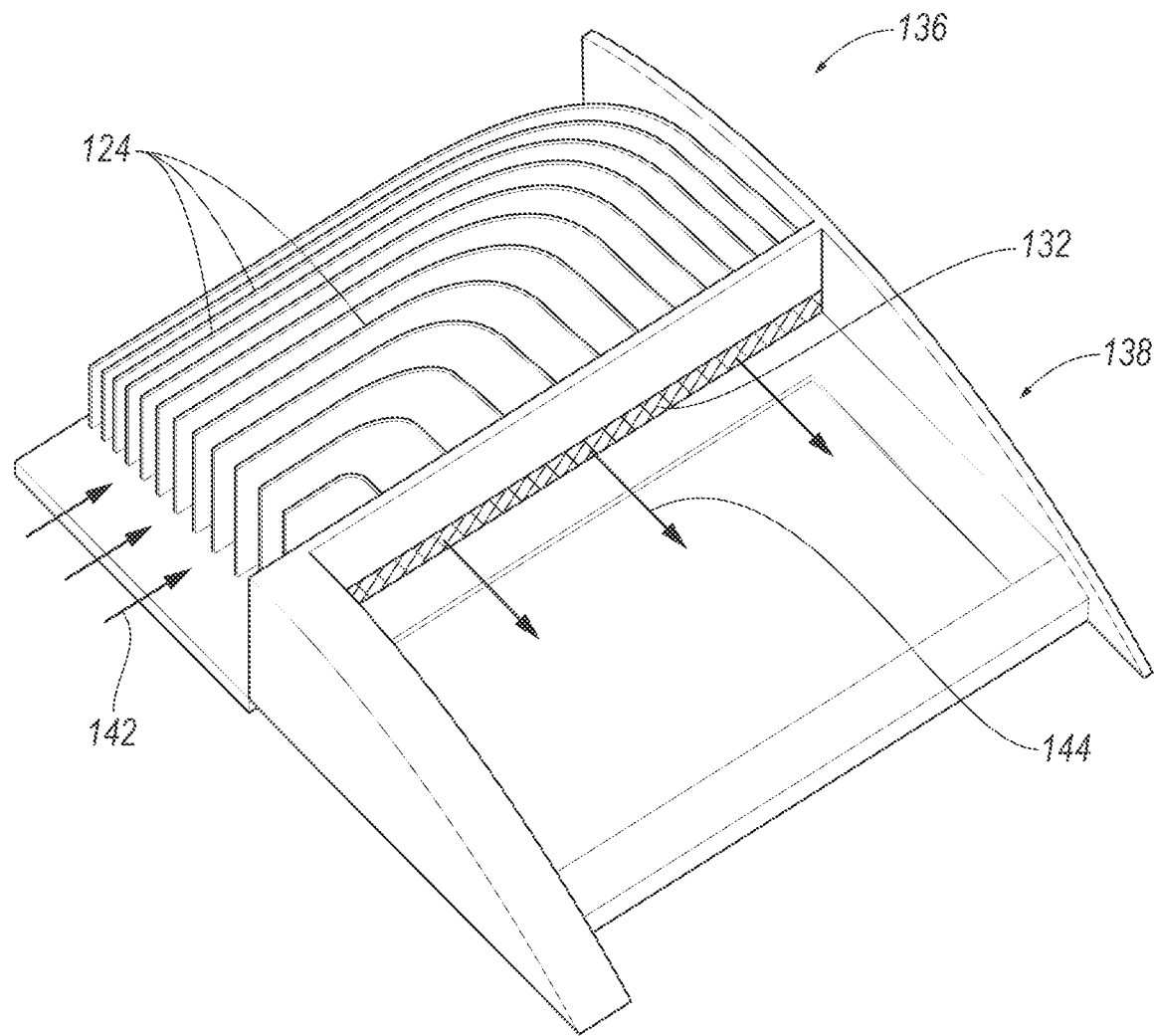
FIG. 3 illustrates a partial perspective view of a cooling system of the LIDAR of FIG. 3.

The conditioning element 136 (again, as shown in FIG. 3), may be arranged within the sensor head 110. In some examples, the conditioning element may surround an enclosure that surrounds the LIDAR electronics inside the sensor head 110. In other examples, the conditioning element may surround the LIDAR electronics and a separate enclosure is not needed. The conditioning element, which is shown and described in more detail with respect to FIG. 3, may be capable of cooling the LIDAR system 106, including the LIDAR electronics. In one example, the conditioning element may be a heat sink configured to dissipate heat away from the electronics. The conditioning element 136 may also be configured to direct airflow from the fan 124 to certain areas of the housing 112, including the window 116. The conditioning element 136 may also be configured to direct airflow from the external environment. This airflow may be received via the slots 130 into the conditioning element, especially as the vehicle traverses the external air while driving. Additional airflow may also be generated based on the rotation of the LIDAR system 106 as well.

FIG. 3 illustrates a partial perspective view of the conditioning element 136 of the LIDAR system 106 of FIGS. 1 and 2. As illustrated in FIG. 3, the conditioning element 136 may include the enclosure 138. The enclosure 138 may be shaped generally similar to the sensor head 110 and be configured to form the framework for the conditioning element 136 by maintaining the LIDAR electronics in a center and supporting other cooling features on the other side of the enclosure 138. For example, the conditioning element 136 may include a plurality of spaced fins 140. The enclosure 138 may maintain the conditioning element 136 between the enclosure and the housing 112. The fins 140 may be arranged around the enclosure 138 and extend outwardly therefrom.

The fins 140 may extend vertically with respect to the enclosure 138 and transition into a horizontal arrangement, eventually opening up to the window 116 via an opening 132 defined by the enclosure 138. The fins 140 may be 'bent' at a transition portion between the vertical and horizontal portions where the vertical portion is generally perpendicular to the horizontal portion. The fins 140, as explained, may act as a heat sink to dissipate heat away from the LIDAR electronics. The fins 140 may also facilitate airflow therebetween, and specifically, facilitate airflow onto the window 116.

In one example, a first airflow 142 may be received at the vertical portions of the fins 140 from an underside of the sensor head 110. This airflow 142 may be generated by the fan 124 arranged below the sensor head 110. The vertical portions of the fins 140 may allow for the airflow to be received from the vertical airpath created by the fan 124 through the support structure 122. The horizontal portions of the fins 140 may then direct a second airflow 144 onto the window 116.

The airflow through the fins 140 (not specifically shown in FIG. 3, may be configured to cool the fins 140 and thus cool the sensor head 110. The airflow may generally increase in temperature as it flows over the fins 140. The heated airflow may then be directed onto the window 116. The heated airflow may provide a debris clearing effect on the window 116 where any debris, dust, etc., collected on the window 116 may be generally blown off by the second airflow 144. The second airflow 144 may also provide a defrosting function in the event that frost or condensation has built up on the window 116 due to low ambient temperatures. Thus, the airflow created by the fan 124 below may both cool and clean the LIDAR system 106.

The fins 140 illustrated in FIG. 3 are example fins 140 and the fins 140 may be any shape and/or size, and may be separated by any amount of space. In one example, the fins 140 may be 1 mm thick and may be separated by a spacing of 4 mm. However, any other thickness, spacing, or other properties of the fins 140 may also be applicable. Additionally, the conditioning element 136 may include any number of fins 140. The fins 140 may also be composed of any material, such as, for example, aluminum. The fins 140 may also be nickel-plated or anodized, or may be created through any number of other types of treatment processes.

The number of fins 140, size and/or shape of each of the fins 140, and any other properties of the fins 140 and/or the conditioning element 136 as a whole may also vary depending on their proximity to locations on the enclosure at which it may be desired to provide additional cooling. For example, a part of an enclosure adjacent to a particular LIDAR electronic may be desired to be cooled to a greater extent than a part of the enclosure not adjacent to any LIDAR electronics (more heat may need to be dissipated from the portions of the enclosure including electronics than the portions of the enclosure not including electronics, for example). In this case, the portion of the conditioning element 136 in contact with the part of the enclosure adjacent to the LIDAR electronics may be configured in such a way as to provide additional cooling at that location. That is, the fins 140 of the conditioning element 236 at this location may be different in size than fins at locations not associated with electronics.

Specifically, the fins 140 may include various sets of fins 140 that correspond and are arranged adjacent to each window 116 of the housing 112. Although only one window 116 is illustrated throughout the figures, more than one window 116 may be defined by the housing 112 and an associate set of fins 140 may be arranged adjacent to each window to aid in cooling and cleaning of the window 116.

As explained, the fins 140 may extend from the enclosure. As such, the conditioning element 136 may form a cylindrical or partially-cylindrical shape similar to that of the sensor head 110. However, the shape of the conditioning element 136 may not necessarily be limited to a cylindrical or partially-cylindrical shape. The one or more windows 116 may provide signal ingress and/or egress for the electronics housed within the enclosure 138. For example, as mentioned above, the enclosure 138 may include one or more emitting devices and one or more detector devices. The windows 116 may be positioned such that egress of light signals from the one or more emitting devices and ingress of return light signals to the one or more detector devices may be possible through the conditioning element 136. As such, the one or more windows 116 may include a transparent or semi-transparent material, such as glass. Additionally, while the airflow from the environment may be used to cool the LIDAR system 106, the structural configuration of the conditioning element 136 including the fins 140, further allows the airflow from the fan 124 to pass over the window 116. In another example, the conditioning element 136 may be provided around the enclosure and may be exposed to the environment (for example, may not be covered by the housing 112).

The conditioning element 136 may be a single solid structure that may be provided within the enclosure including the electronics. For example, the conditioning element 136 may be bolted to, or screwed into, the enclosure, or may be removably affixed to the enclosure in any number of other ways. In some cases, the conditioning element may also be permanently affixed to the enclosure. Although the conditioning element may be depicted as a single solid structure in the figures (e.g., FIG. 3), the conditioning element may also be formed of multiple separate portions rather than being a single solid element.

Figure 4:
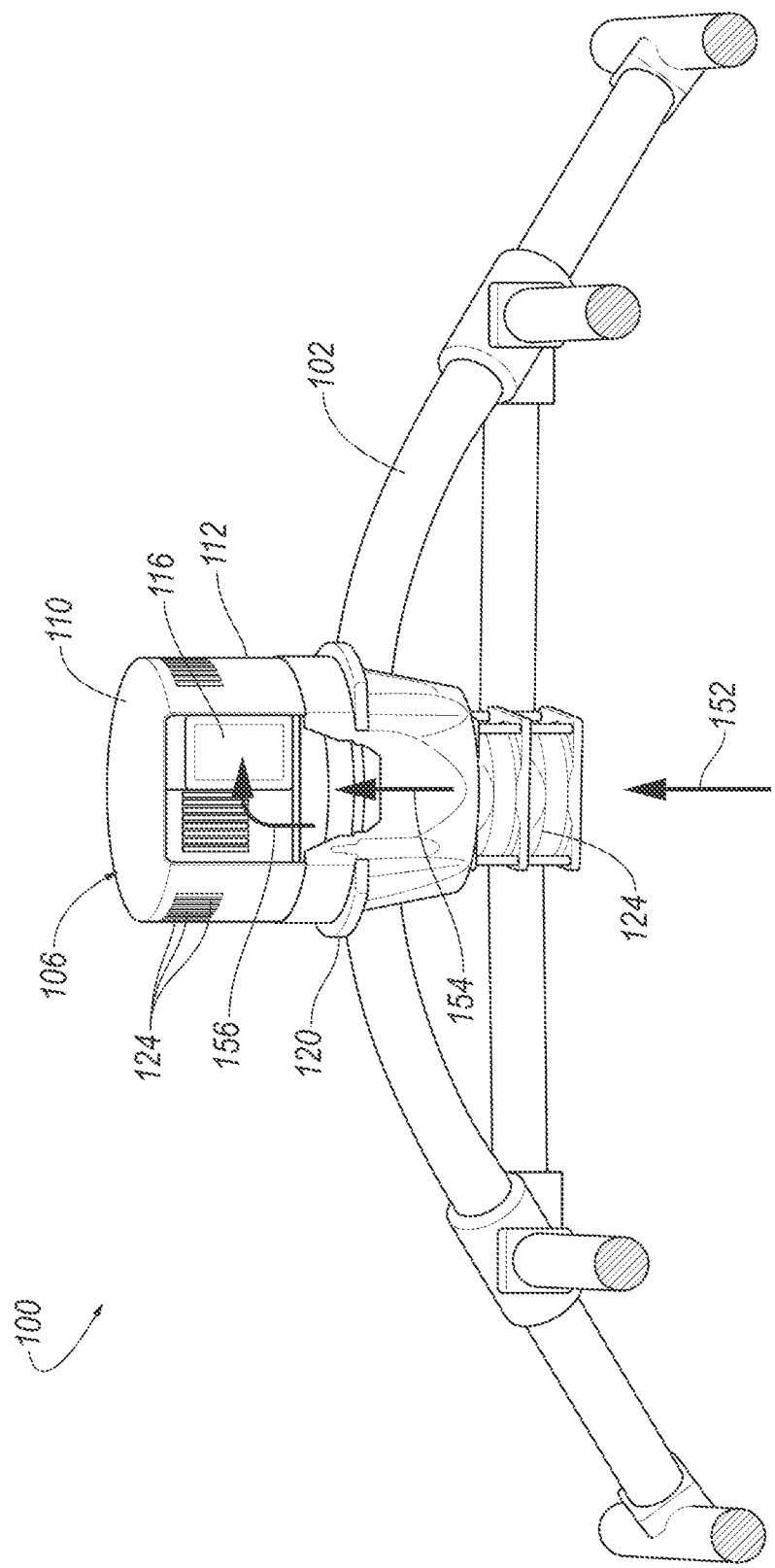
FIG. 4 illustrates a partial front view of the vehicle system of FIG. 1.

FIG. 4 illustrates a partial front view of the LIDAR system 106 of the vehicle sensor system 100 of FIG. 1. As explained above, the fan 124 is arranged below the support structure 122. The support structure 122 may form a duct or airway into the underside of the sensor head 110. As illustrated by a first arrow 152, ambient air may be drawn in by the fan 124 and directed upward through the support structure 122, as indicated by a second arrow 154. At the underside of the sensor head 110, airflow from the support structure 122, as illustrated by second arrow 154, may enter the sensor head 110. This airflow may enter the vertical portion of the fins 140 (as illustrated in FIG. 3), as well as the center area housing the LIDAR electronics. The airflow that enters the vertical portion of the fins 140 may then be bent and pushed through the horizontal portion of the fins 140 onto the window 116. This is illustrated by the third arrow 156. As heat dissipates from the fins 140, the airflow across the fins 140 may increase in temperature and be pushed onto the window 116 to clean the window 116. Thus, with a single airflow, the LIDAR sensor 106 is both cooled and cleaned with a single system and singularly generated airflow.

Figure 5:
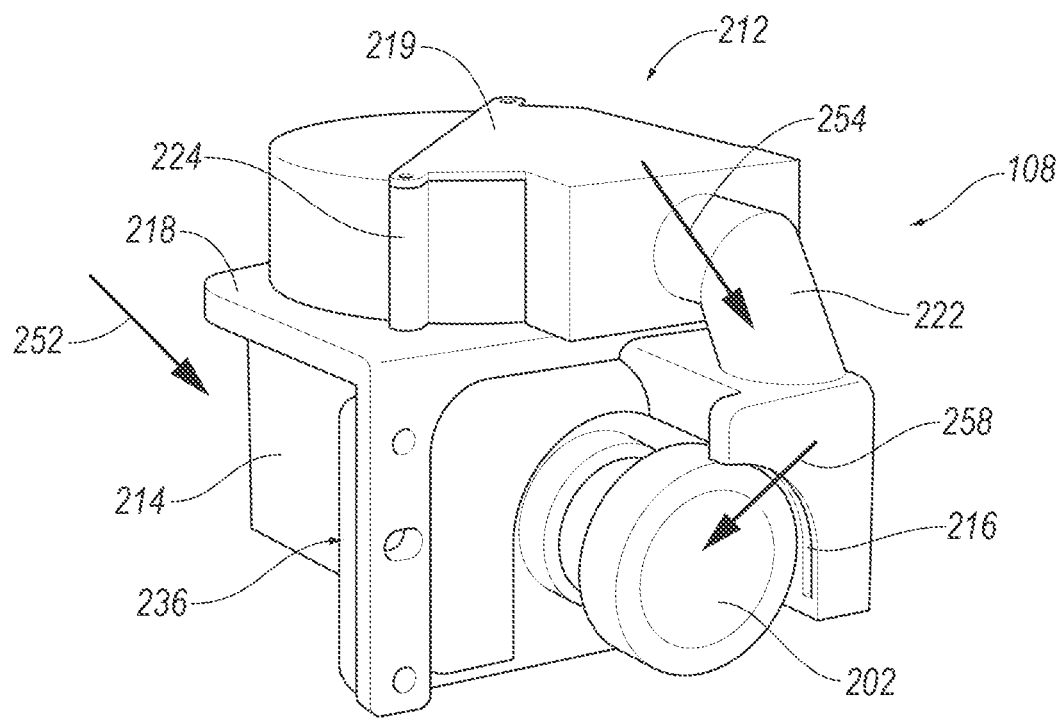
FIG. 5 illustrates a front perspective view of a camera assembly of FIG. 1.
Figure 6:
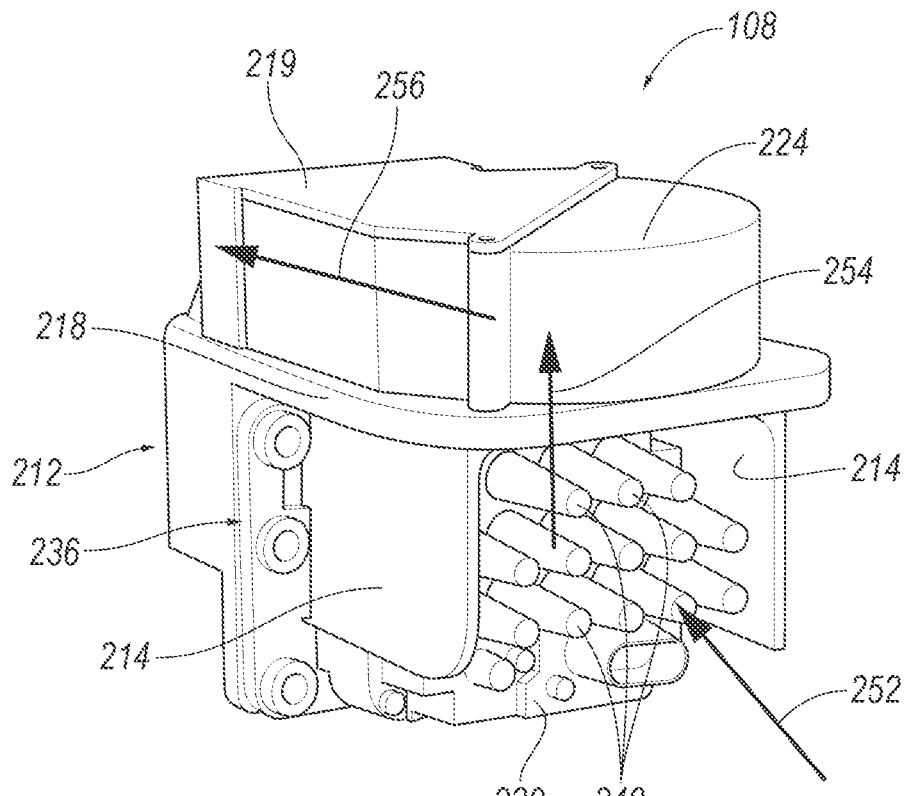
FIG. 6 illustrates a rear perspective view of a camera assembly of FIG. 1.

FIG. 5 illustrates a front perspective view of a camera assembly 108 and FIG. 6 illustrates a rear perspective view of a camera assembly 108 of FIG. 1. The camera assembly 108 may include any camera such as a still camera, video camera, etc., including spectrum cameras, infrared cameras, etc. The camera assembly 108 is configured to capture images of an environment around the vehicle. The camera assembly 108 may be used to collect object data relating to position, or other data about an object that other sensors may not be capable of sensing. Multiple camera assemblies 108 may be arranged on the frame and in one example, may be used for triangulation with respect to determine a distance of an object from the vehicle.

The camera assembly 108 may include a lens 202 configured to, in combination with the camera body, capture images. The lens 202 may be unobstructed so as to have an unobstructed view of object and thus may be exposed to the exterior elements such as rain, debris, wind, etc. As such, the camera lens 202 may benefit from cleaning. Further, the camera assembly 108 may generate heat and the camera assembly 108 may be required to be maintained within certain temperature limits in order for the sensing unit to function properly.

The camera assembly 108 may include a camera housing 212 configured to house the camera body (not individually labeled) and the camera lens 202. The housing 212 may define a lens opening or window 216 configured to expose the lens 202 of the camera assembly 108 to the external environment. The lens window 216 may also allow airflow from the external environment to enter or exit the inside of the housing 212. The window 216 may include a transparent or semi-transparent material, such as glass. Additionally or alternatively, the window may be an opening.

The camera assembly 108 may be a self-contained single unit including a fan 224. The fan 224 may be arranged and held within the camera housing 212 and on top of the camera body. Specifically, the camera housing 212 may define a shelf 218 and a top portion 219 configured to maintain the fan 224 therebetween.

As best shown in FIG. 6, the camera assembly 108 includes a camera conditioning element 236. The camera conditioning element 236 may be maintained by the housing 212 between parallel supports 214 extending downward from the shelf 218. The camera conditioning element 236 may include a plurality of camera fins 240 extending from a back support 220. The fins 240 may be rod-like fins and extend parallel to the shelf 218 to a fixed distance similar to the width of the parallel supports 214. The fins 240 may be equally spaced forming a grid-like arrangement. Alternatively, the fins 240 may be randomly spaced along the back support 220. In one example, the conditioning element 236 may be a heat sink configured to dissipate heat away from the electronics of the camera body and lens 202.

Similar to the example of FIG. 3, the fins 240 illustrated in FIG. 6 are example fins 240 and the fins 240 may be any shape and/or size, and may be separated by any amount of space. In one example, the fins 240 may have a 2 mm diameter and may be separated by a spacing of 4 mm. However, any other radii, spacing, or other properties of the fins 240 may also be applicable. Additionally, the conditioning element 236 may include any number of fins 240. The fins 240 may also be composed of any material, such as, for example, aluminum. The fins 240 may also be nickel-plated or anodized, or may be created through any number of other types of treatment processes. Further, the number of fins 240, size and/or shape of each of the fins 240, and any other properties of the fins 240 and/or the conditioning element 236 as a whole may also vary depending on their proximity to locations on the enclosure at which it may be desired to provide additional cooling. For example, more fins 240 may be arranged in the area behind the camera processor, a component that generates more heat than other elements.

The housing 212 may define a duct 222 configured to vent air from the fan to the lens 202. The duct 222 may define an opening 232 adjacent the camera lens 202. The shelf 218 may define a shelf opening (now shown) configured to allow for air to be received therethrough by the fan 224. The fan 224 may pull air from below the shelf 218 and transmit it through the duct 222 onto the camera lens 202. The fan 224 may thus facilitate dual functions. For one, the fan 224 may move air across the fins 240, increasing airflow across the fins 240, and thus increasing heat dissipation. The fan 224 may also blow air onto the lens 202 to clear debris and other external elements.

Referring to both FIGS. 5 and 6, a first arrow 252 may indicate a first airflow from the external environment. This airflow may be pulled across the fins 240 by the fan 224. Once the airflow crosses the fins 240, the fins 240 may dissipate heat into the airflow, heating the air. This is indicated by a second arrow 254. The fan 224 may then receive and move the warmed air from the back of the camera body into the duct 222, as indicated by a third arrow 256. The duct 222 may then deliver the warmed air to the lens 202 via the opening 232, as indicated by the fourth arrow 258. The warmed air may clean the lens 202, as well as melt any ice buildup, clear condensation, etc.

Figure 7:
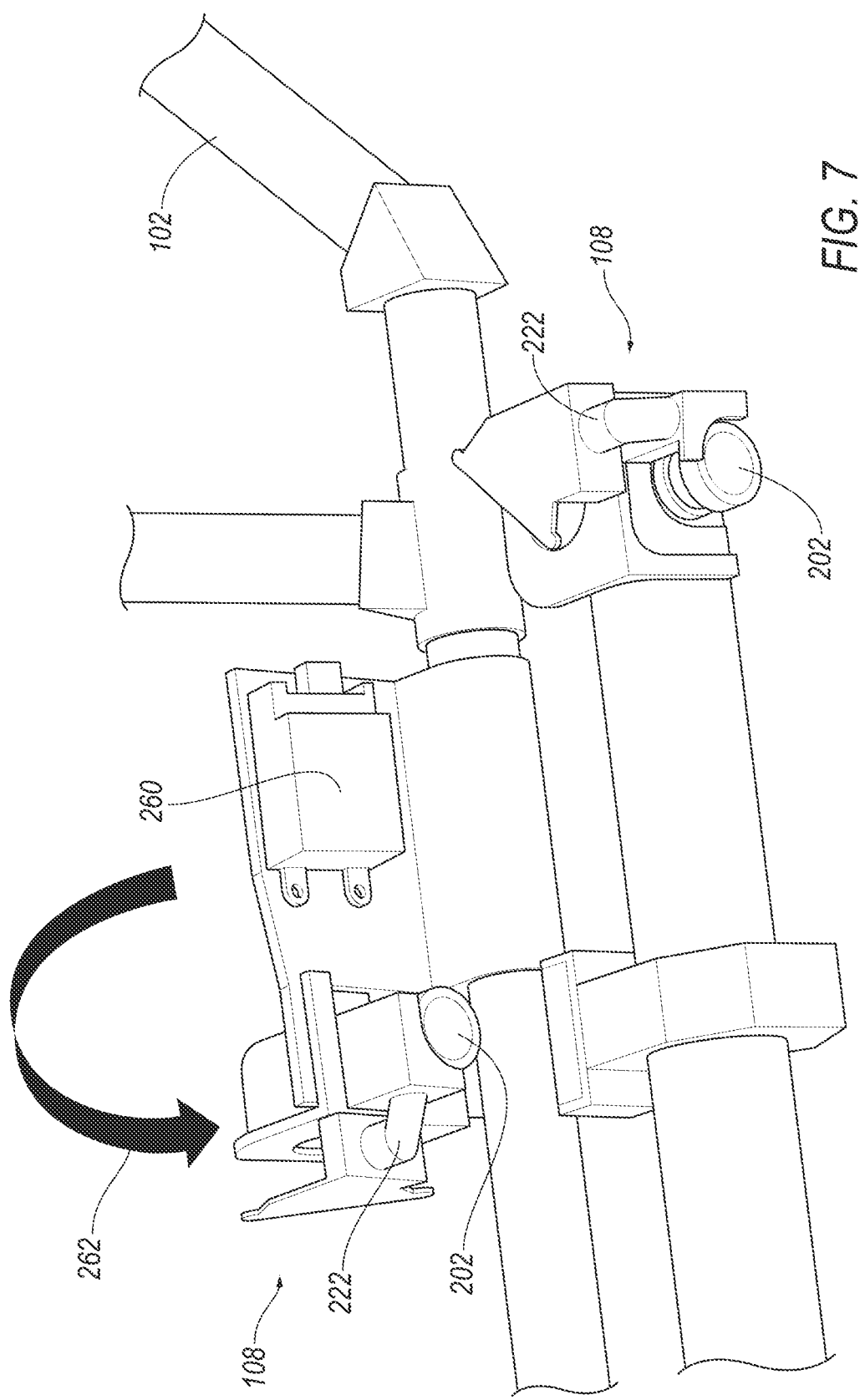
FIG. 7 illustrates a partial perspective view of the camera assembly with a LIDAR of the vehicle system of FIG. 1.

FIG. 7 illustrates a partial perspective view of the camera assembly 108 with an adjacent system sensor 260, such as a LIDAR system, or other sensor. In this configuration, airflow may extend over the adjacent sensor 260 prior to extending over the fins 240 of the camera assembly 108. In this case, the adjacent sensor 260, similar to the camera assembly 108, may generate heat. Any air in the surrounding external area of the adjacent sensor 260 may in turn increase in temperature. As air moves from near the adjacent sensor 260 to the camera assembly 108, as indicated by the fifth arrow 262, the air may move towards the camera assembly 108.

Because the warmed air from the adjacent sensor 260 is drawn from the adjacent sensor, across the fins 240 of the camera assembly 108, through the fan 224 and duct 222 to the lens 202, the lens 202 may have the benefit of receiving additionally warmed air. This would increase the rate for melting of any ice build up and further aid in quickly and efficiently clearing any buildup at the lens 202.

While the sensor units described herein general are described with respect to LIDAR systems and cameras, other sensor units may benefit from the technology described herein, including but not limited to sound navigation and ranging (SONAR) systems, radio detection and ranging (RADAR) systems, ultrasonic sensors, temperature sensors, location sensors, position sensors (e.g., global positioning system (GPS), etc.), location sensors, fuel sensors, motion sensors (e.g., inertial measurement units (IMU), etc.), humidity sensors, occupancy sensors, or the like.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle sensing system, comprising:
a housing for containing sensor electronics, the housing having at least one window being aligned with at least one of the sensor electronics within the housing;
a fan arranged proximate to the housing and configured to provide airflow through the housing; and
a conditioning element arranged on the housing and having a plurality of fins configured to receive the airflow generated by the fan to cool the sensor electronics, wherein airflow passing over the sensor electronics is directed onto the window to recycle the airflow used to cool the electronics to clean to the window,
wherein the sensor electronics includes a camera lens wherein the at least one window aligns with the camera lens, and further wherein the sensor electronics include two adjacent sensors and wherein the fan pulls air from a first of the sensors through the fins arranged on a second of the sensors to clean the window of the second of the sensors with air warmed from each of the first and second sensors.

2. The system of claim 1, wherein the fins operate as a heat sink for the sensor electronics to collect waste heat.

3. The system of claim 1, wherein the fan is arranged between a shelf and upper portion of the housing, the shelf arranged above the fins.

4. The system of claim 3, wherein the housing includes a duct, wherein the fan is configured to pull air over the fins and through the fan to the duct, the duct defining an opening at the window to provide warmed air for cleaning the window.

5. The system of claim 1, wherein the fan is arranged above the fins to pull external air across the fins and into the fan.

6. The system of claim 1, wherein the sensor electronics include LIDAR electronics and wherein the at least one window aligns with at least one LIDAR electronic.

7. The system of claim 6, wherein the fan is arranged below the housing and configured to provide airflow through a lidar mounting plate and into the underside of the housing.

8. The system of claim 7, wherein the plurality of fins include a vertical portion configured to receive the airflow from the fan to cool the LIDAR electronics, and a horizontal portion relative to the vertical portion and configured to direct warmed air from the vertical portion horizontally onto the window to provide the warmed air to the window.

9. The system of claim 8, further comprising an enclosure arranged within the housing and configured to maintain the conditioning element between the housing and the enclosure.

10. The system of claim 9, wherein the enclosure defines an opening arranged at an end of the horizontal portion of the fins allowing air to escape from the fins onto the window.

11. The system of claim 1, wherein the housing defines a plurality of slots configured to allow air to pass therethrough.

* * * * *